United States Patent

Castaldi

[15] 3,690,479

[45] Sept. 12, 1972

[54] AUTOMATIC SEARCH AND RETRIEVAL SYSTEM

[72] Inventor: John A. Castaldi, Brooklyn, N.Y.

[73] Assignee: Supreme Equipment & Systems Corp.

[22] Filed: Nov. 3, 1969

[21] Appl. No.: 873,606

Related U.S. Application Data

[63] Continuation-in-part of Ser. No. 681,259, Nov. 7, 1967, Pat. No. 3,490,616.

[52] U.S. Cl. ............................214/16.4 A, 214/8.5 D
[51] Int. Cl. ...............................................B65g 1/06
[58] Field of Search.......214/16.4 R, 16.4 A; 234/40, 234/89; 235/61.11, 61.114, 61.115; 340/173, 174, 174.1 C; 221/7

[56] References Cited

UNITED STATES PATENTS

| | | | |
|---|---|---|---|
| 1,937,024 | 11/1933 | Kurth | 221/7 |
| 2,707,666 | 5/1955 | Becker | 214/16.4 A |
| 2,940,068 | 6/1960 | Stiefel | 214/16.4 A X |
| 3,034,643 | 5/1962 | Keller et al. | 340/174.1 C |
| 3,076,566 | 2/1963 | Dennis | 214/16.4 A |
| 3,119,501 | 1/1964 | Lemelson | 214/16.4 A |
| 3,206,041 | 9/1965 | McGrath | 214/16.4 A |
| 3,297,379 | 1/1967 | Artaud et al. | 214/16.4 A X |
| 3,351,219 | 11/1967 | Ruderfer | 214/16.4 A |
| 3,402,836 | 9/1968 | Debrey et al. | 214/16.4 A |
| 3,463,566 | 8/1969 | Powers | 214/16.4 A |
| 3,520,424 | 7/1970 | Lemelson | 214/16.4 A |

Primary Examiner—Gerald M. Forlenza
Assistant Examiner—Raymond B. Johnson
Attorney—Sandoe, Hopgood & Calimafde

[57] ABSTRACT

The invention contemplates efficient, automatic retrieval of selected quantities of specific items from an inventory which may involve a large variety of items. The inventory is presented via a two-dimensional matrix of stationary storage compartments having open sides in essentially a single retrieval-access plane common to the compartments of the matrix. Each compartment accommodates a stacked plurality of like items, with an end item of each stack presented at a retrieval-access plane. Digitalized character identification applicable to and located at each compartment is externally exposed at said plane. Retrieval-slide means is positioned by compartment-selection control means, on orthogonally related guides, adjacent any particular compartment opening. The control means includes a compartment-digit selector, character-scanning means carried by the retrieval-slide means, and coincidence-detection means responsive to the outputs of the selector and the scanning means.

25 Claims, 17 Drawing Figures

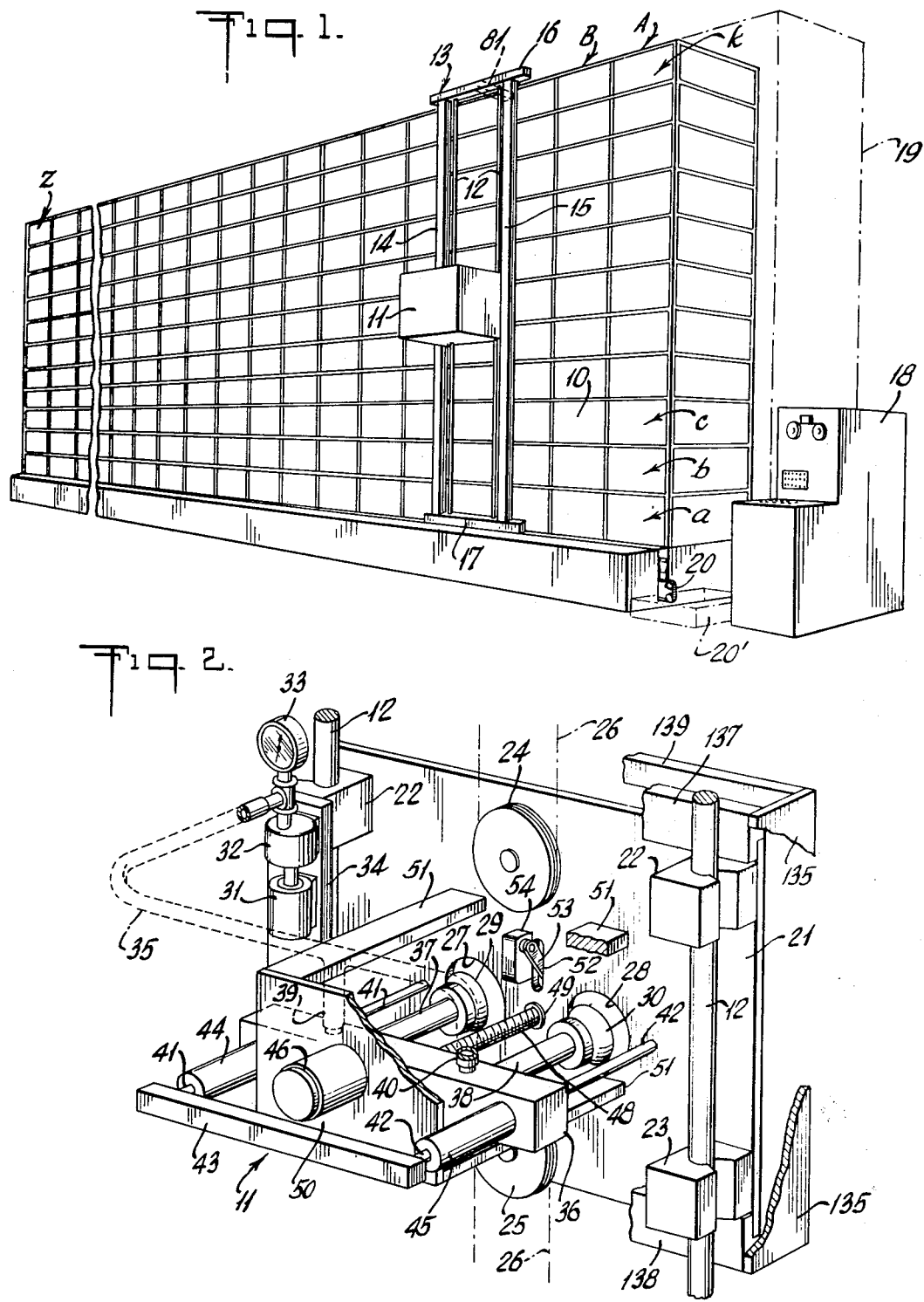

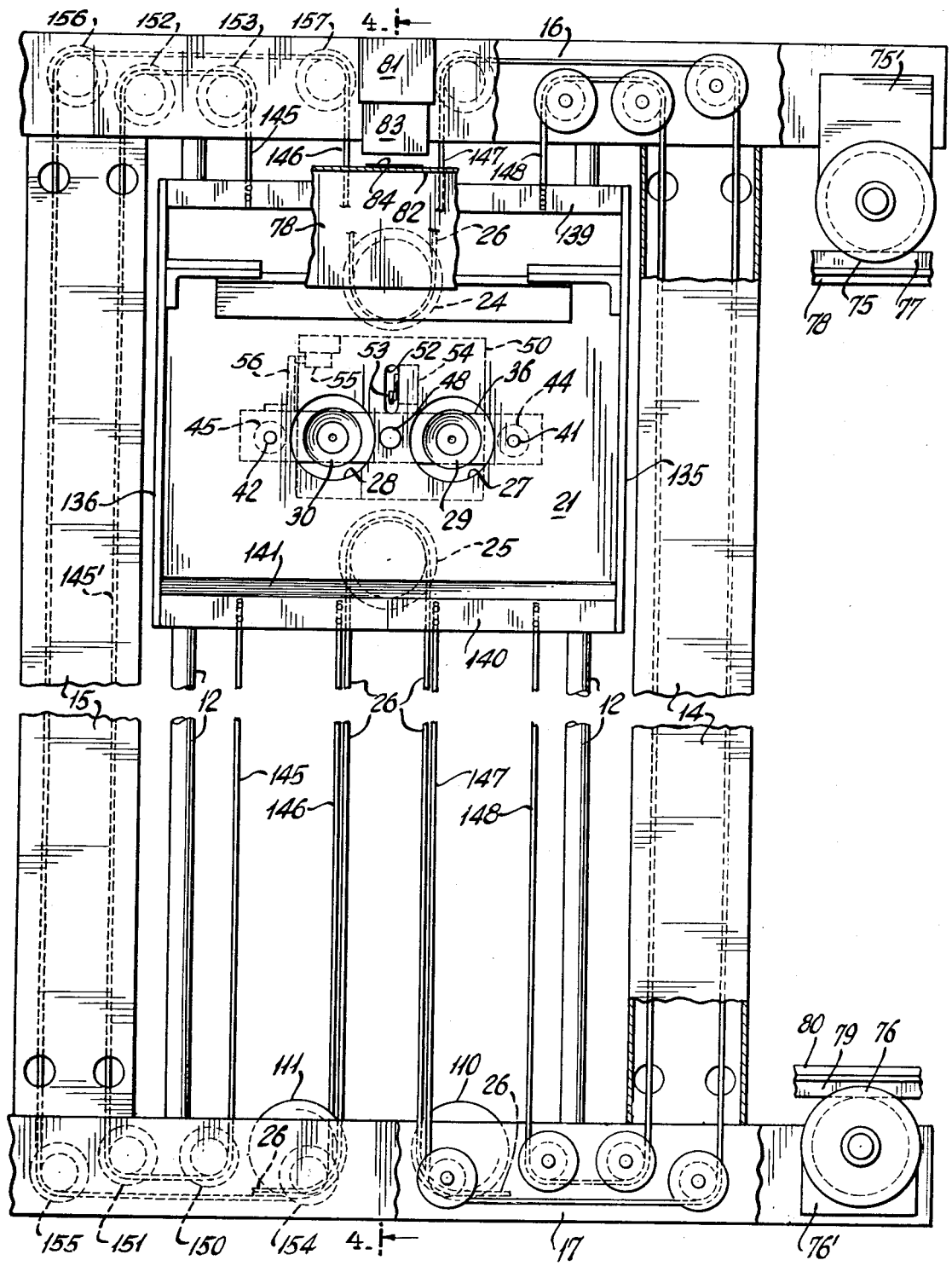

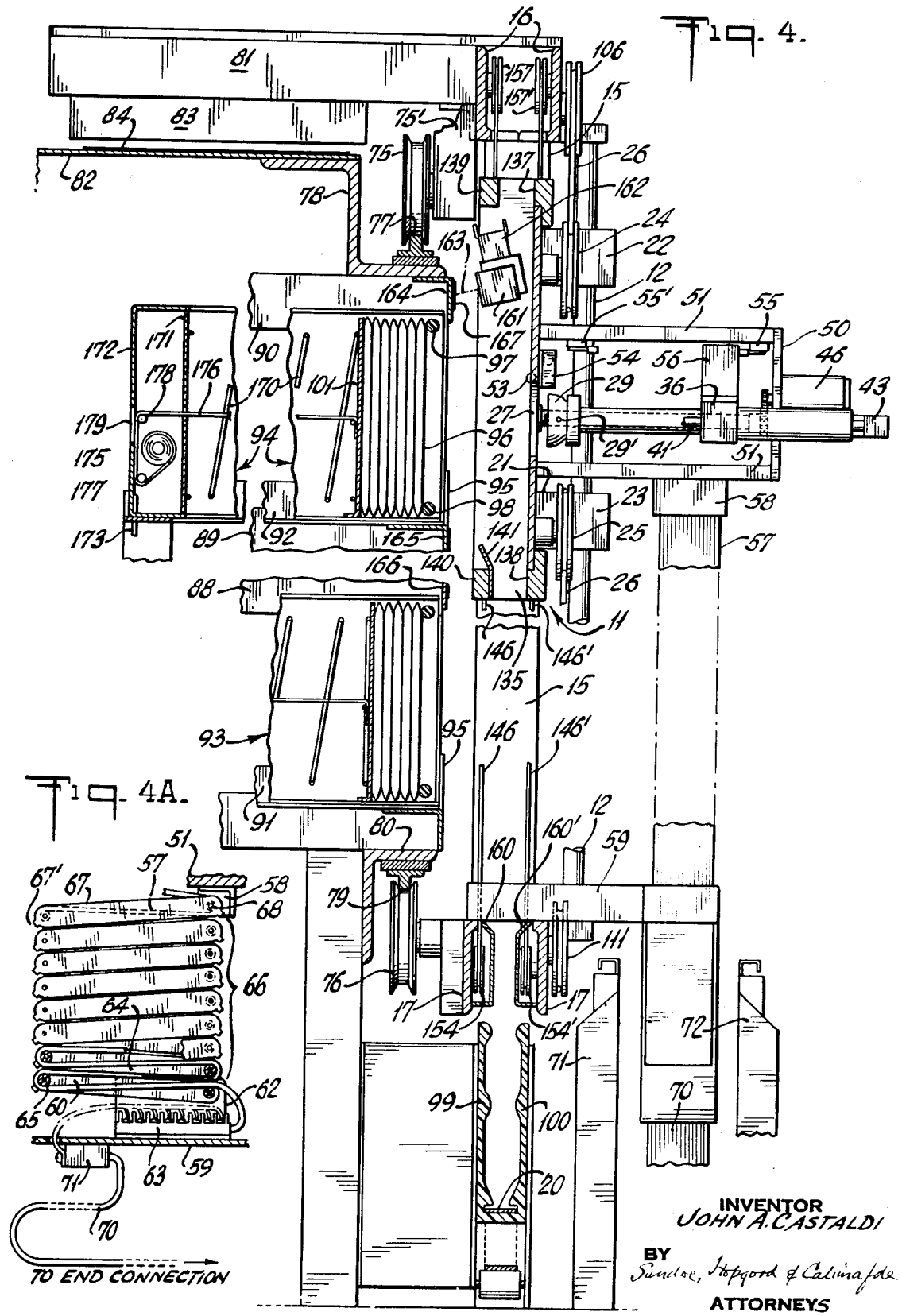

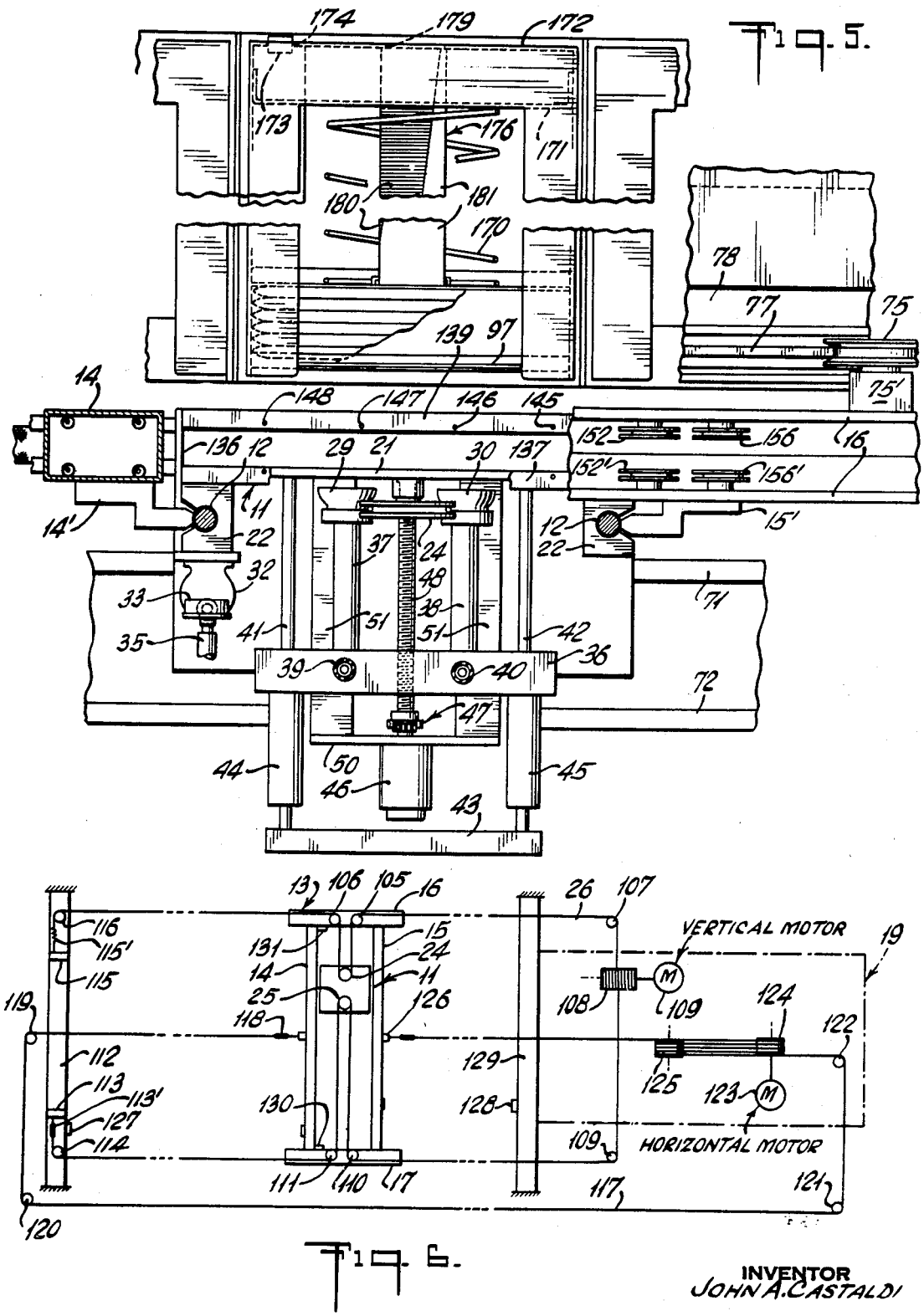

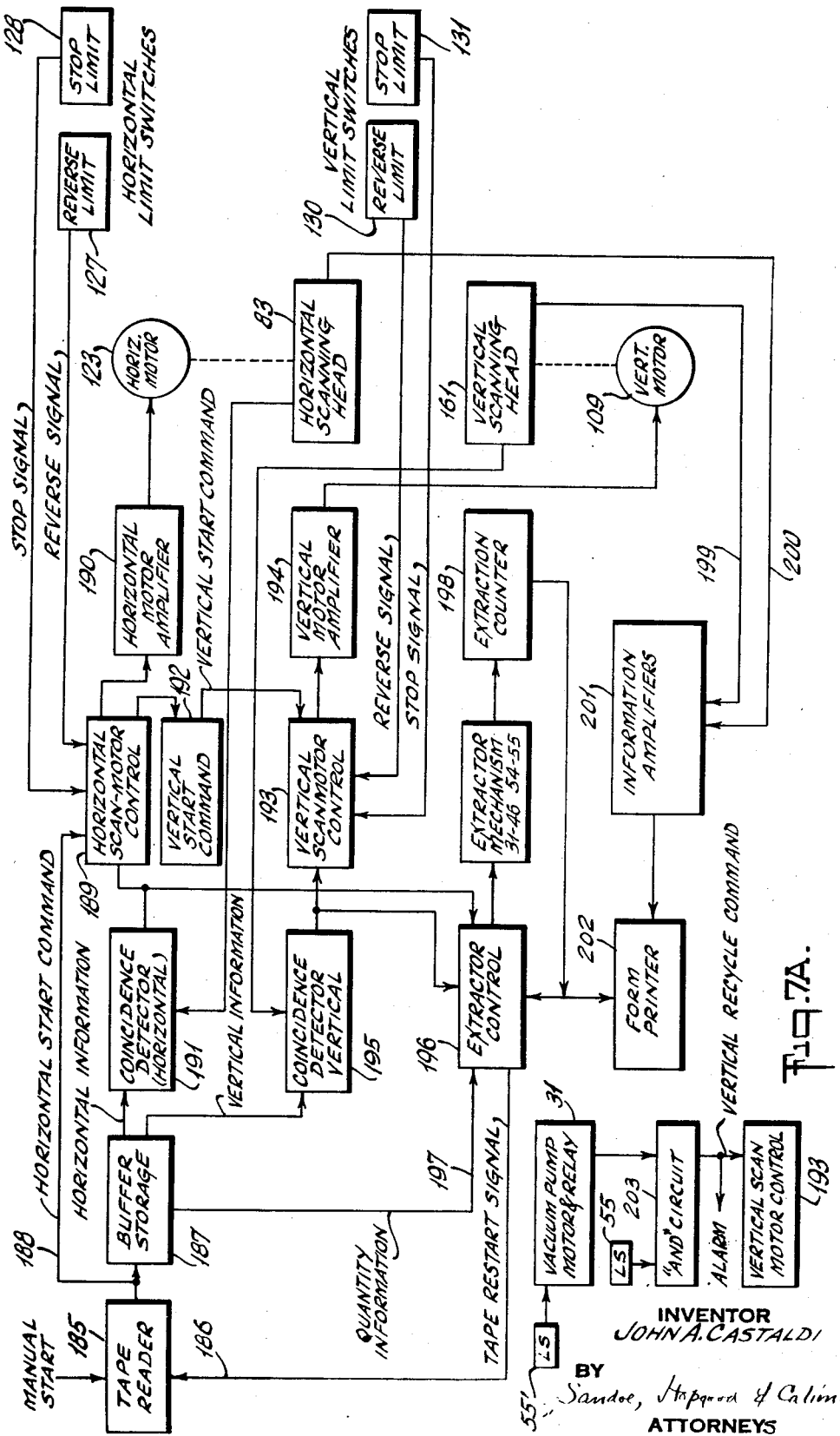

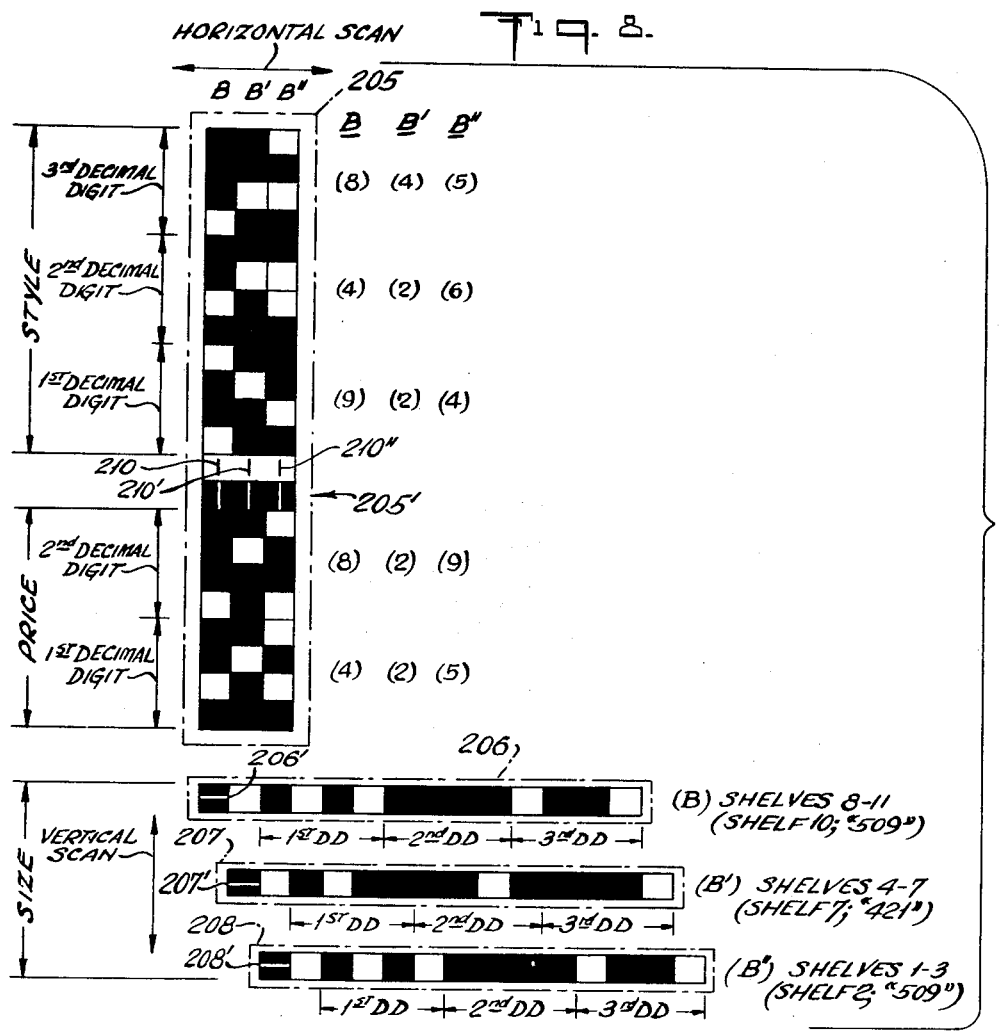
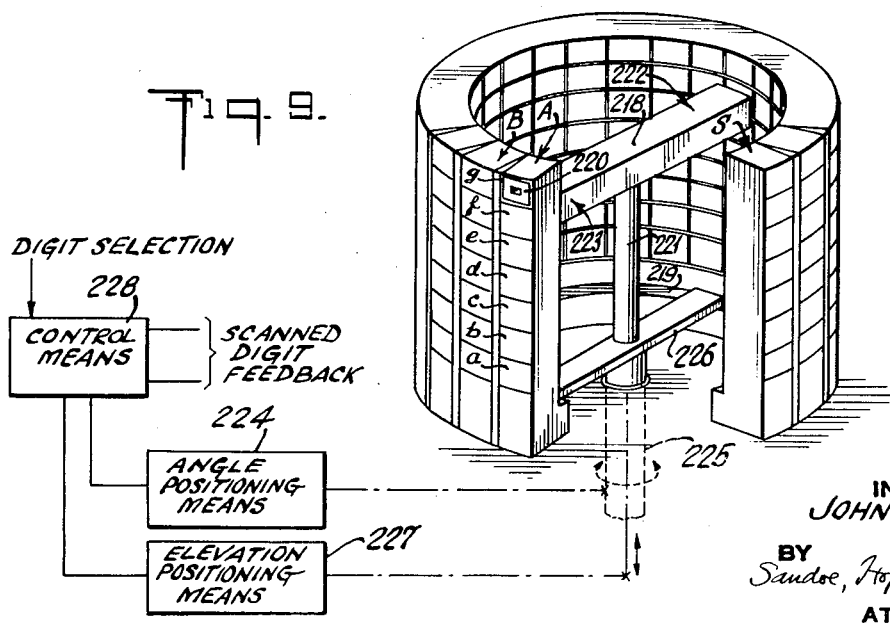

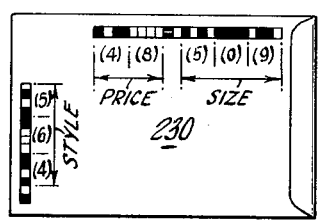
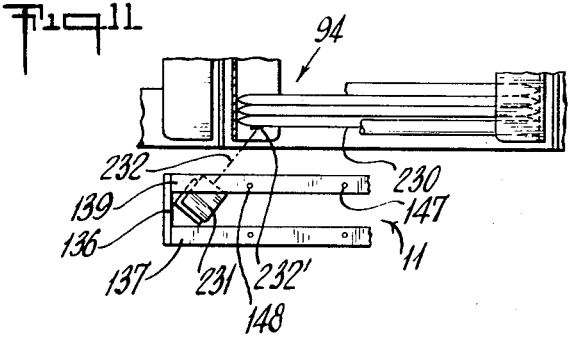
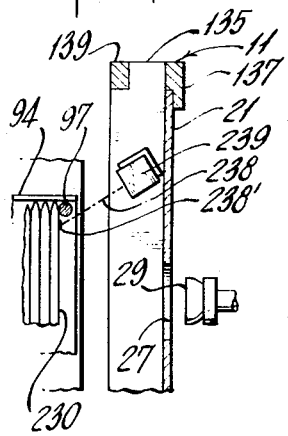
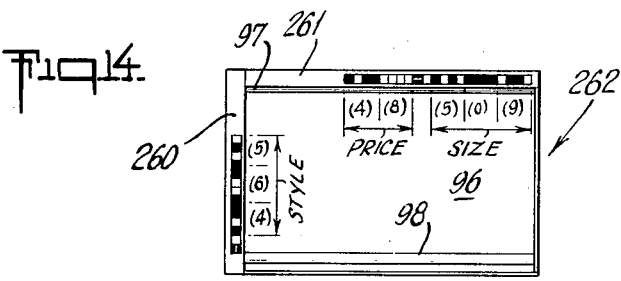
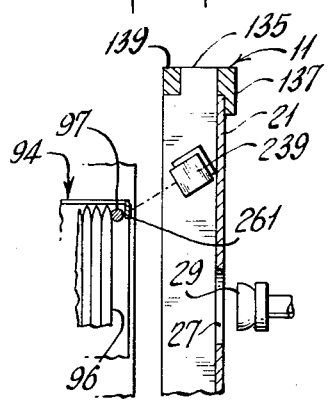
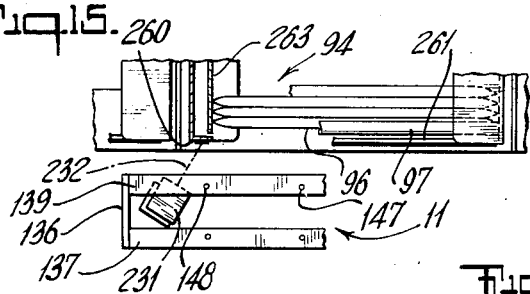
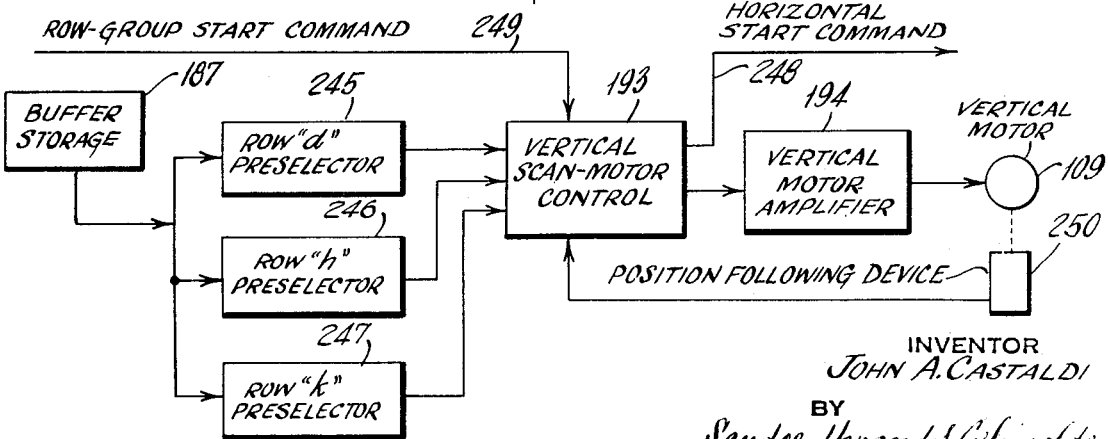

AUTOMATIC SEARCH AND RETRIEVAL SYSTEM

This application is a continuation-in-part of my copending application, Ser. No. 681,259, filed Nov. 7, 1967, now Pat. No. 3,490,616.

This invention relates to an automatic package retrieval device wherein desired quantities of particularly packaged items are sought out and extracted from an inventory of a large variety of packaged items.

In many kinds of businesses today, it is becoming increasingly important to reduce the cost of handling inventories involving large varieties of standardized products. It is important to obtain quick access to the desired item, which may be available in different styles, sizes, quality (or price), and to efficiently select the quantities of each item needed to service each successive customer order. Efforts to solve the problem have been cumbersome, uneconomic and unreliable, so that the old and established technique of hand operation, employing unduly large numbers of personnel for individual manual operations, is still the mainstay.

In the dress-pattern industry, for example, where a given manufacturer may have a policy of offering as many as 500 or 1,000 different styles of garment pattern at any one time, this policy must be implemented by offering packaged patterns for a range of sizes for each pattern. This means that, at any one time, inventory must provide an availability of as many as 8,000 to 10,000 different pattern packages. Of course, to fill individual customer orders, as for example, one package of "size 32 long" in "style 224", plus 1 dozen packages of "size 36 regular" in "style 224", etc., many hand operations and much trained clerical skill are required; and this is not to mention the time-consuming nature of the operation, even if it be assumed that the skilled operators function at peak efficiency all the time.

Other industries, such as the greeting-card industry, the drug industry concerned with packaged drug items for supply to retail druggists, etc., have similar problems, stemming from the concurrent offering for sale of a tremendous variety of different items.

For present purposes, the expression "item" or "package" or "packaged item" will be understood to be generic, whether the thing to be retrieved is a single card from a stack of cards, or a plurality of stuffed envelopes in a stack, or a plurality of like boxes in a stack.

It is an object of the invention to provide an improved automatic retrieval system which will avoid difficulties and disadvantages of previous systems, enabling the user to substantially reduce the expense, error and time-consumption involved in previous techniques Another object is to provide an automatic retrieval system meeting the above object and providing the function of self-checking itself prior to extracting or retrieving the desired items from inventory.

A further object is to meet the above objects with a device inherently providing instantaneous indication of the current inventory status, following the retrieval of ordered items.

A specific object is to provide an improved package retrieval system with coded scanning means readily understandable to relatively unskilled set-up personnel, and at the same time, readily adaptable to the customer's present inventory-identification codes, whether binary or decimal in nature.

Another specific object is to provide in a system meeting the above objects an inherent capacity for adaptation to change in the make-up of the customer's current spread of commercial offerings, as when a dress-pattern manufacturer discontinues all sizes of its old "style 948" and substitutes a variety of sizes of new "style 465", such adaptability being independent of set-up for those prior styles and sizes which continue to be offered for sale.

A further specific object is to provide, in such a system, coded identification unique for each item and readily read by relatively unskilled attending personnel, such identification and reading being in immediate adjacency to each particular item, if not on the item itself.

It is also a specific object to provide adaptability to changed set-up, as indicated, without requiring the slightest change in scanning mechanism involved in item-selection and retrieval.

Still another specific object is to provide random-access capability in a system of the character indicated; in other words, the system shall be capable of scanning for a particular coded item, regardless of whether or not the different varieties are sequentially arrayed.

Other objects and various further features of novelty and invention will be pointed out or will occur to those skilled in the art from a reading of the following specification, in conjunction with the accompanying drawings. In said drawings, which show, for illustrative purposes only, a preferred form and a modified form of the invention:

FIG. 1 is a simplified view in perspective showing an inventory system of the invention with retrieval-access means positionable to retrieve any selected one of a large variety of inventoried items;

FIG. 2 is an enlarged fragmentary view in perspective, with certain parts broken away to reveal internal mechanism of the retrieval-access slide in the system of FIG. 1;

FIG. 3 is a rear view in elevation of the retrieval-access slide, its guide means, and a small part of the main frame, parts being shown fragmentary in order to reveal greater detail of the assembled relationship;

FIG. 4 is a vertical sectional view, taken generally, in the plane 4—4 of FIG. 3;

FIG. 4A is a simplified view in elevation partly broken away and in section to reveal provision for flexible control and supply cable means, serving the slide of FIG. 4;

FIG. 5 is a fragmentary plan view of the structure of FIGS. 3 and 4, with certain parts broken away to provide a greater showing;

FIG. 6 is a simplified diagram schematically illustrating slide-positioning drive connections for the slide of FIGS. 3 to 5;

FIG. 7 is a block diagram schematically depicting interconnection of control and drive mechanism, for positioning and retrieval functions of the system of FIGS. 1 to 6;

FIG. 7A is a fragmentary block diagram to illustrate an optional feature for inclusion in the diagram of FIG. 7;

FIG. 8 is a diagram illustrating codification utilized in the unique identification of each compartment in the inventory system of FIG. 1 and functioning with the scanning system to permit identification and location of a particular compartment from which a desired number of stored items is to be retrieved;

FIG. 9 is a simplified perspective diagram on a reduced scale illustrating another form of retrieval-access system incorporating features of the invention;

FIG. 10 is a back view of an envelope package, illustrative of an alternative employment of my invention;

FIG. 11 is a fragmentary plan view of a retrieval slide and adjacent stored packaged items, similar to the corresponding part of FIG. 5, but showing modified apparatus accommodating the package of FIG. 10;

FIG. 12 is a fragmentary side-elevational and sectional view, similar to the corresponding part of FIG. 4, but showing further parts of the modification of FIG. 11;

FIG. 13 is a supplementary block diagram for use with the diagram of FIG. 7 to provide additional functions for implementing one form of the modification of FIG. 11 and 12; and FIGS. 14 to 16 are views respectively similar to FIGS. 10 to 12 to illustrate a modification wherein the item-identifying codification is carried by a removable container for a supply of like items to be selectively retrieved.

Briefly stated, the invention contemplates efficient automatic retrieval of selected quantities of specific items from an inventory which may involve a large variety of items. The inventory is presented via a two-dimensional matrix of stationary storage compartments having open sides in essentially a single retrieval-access plane common to the compartments of the matrix. Each compartment accommodates a stacked plurality of like items, with an end item of each stack presented at a retrieval-access plane. Digitalized character identification applicable to and located at each compartment is externally exposed at said plane. Retrieval-slide means is positioned by compartment-selection control means, on orthogonally related guides, adjacent any particular compartment opening. The control means includes a compartment-digit selector, character-scanning means carried by the retrieval-slide means, and coincidence-detection means responsive to the outputs of the selector and the scanning means.

THE PREFERRED SYSTEM, IN GENERAL

FIG. 1 provides a simplified illustration of an overall system incorporating the invention. The inventory is made available for selective access via a two-dimensional matrix of individual storage compartments, presenting their stored items for selective retrieval in a single upstanding retrieval-access plane. This plane is defined at the primary exposed face shown in FIG. 1, there being in the matrix a plurality of compartment openings arrayed in vertical stacks A, B, ... Z. Each vertical stack comprises a plurality of like compartments $a, b, ... k$, so that the total variety of individual items offered for access and selection from inventory is the product, namely, $kZ$. The open sides of all compartments are, as indicated, presented at the retrieval-access plane, and each compartment includes means accommodating a stacked plurality of like items, the end item of each stack being presented at the retrieval-access plane, as for example, at the opening 10 for the compartment B-c in FIG. 1. At or adjacent each such opening is a character identification (not shown in FIG. 1) applicable to each compartment and utilized by scanning mechanism in a manner to be described.

Access to selected items in the inventory is achieved by way of a retrieval-access slide 11 having scanning means (within the housing shown at 11 in FIG. 1) for observing the applicable character identification for all compartments. The slide 11 is mounted on vertical elongated guides 12 on a main horizontally movable carriage, designated generally 13. The carriage comprises a rigid frame of spaced upstanding members 14–15 and connecting horizontal end members 16–17. The carriage 13 rides horizontally elongated guide means (not shown in FIG. 1). Basic control for the movement and positioning of the slide 11 is governed from a control console 18; and drive mechanism may be contained within an end module, suggested by phantom outline 19, at one longitudinal end of the device.

Once the control-positioning mechanism is operative to locate the retrieval-access slide opposite a desired storage compartment, a retrieval device carried by the slide means 11 is effective to extract the desired number of the particular stored item at the selected compartment. One by one the items are dropped via suitable guide means (not shown in FIG. 1), to a guiding conveyor belt 20 continuously running in a single direction for the full horizontal length of the matrix and effective to discharge each retrieved items, as at the right-hand end depicted at FIG. 1 and into a collection or tote box suggested by phantom outline 20'.

THE RETRIEVAL-ACCESS SLIDE 11

FIGS. 2 to 5 show the slide 11 with its housing removed, in order to present further details of the slide 11 and its means of support, as well as an illustrative few of the compartments to which it has access. Slide 11 is seen, particularly in FIGS. 2 and 4, to comprise essentially a base plate 21 positioned behind and overlapping the upstanding or vertical guide rods 12 on the carriage 13. Bearing blocks 22–23 provide vertically spaced support of the slide base 21 on each of the guide rods 12. Vertically spaced pulleys 24–25 are journaled for rotation in the base plate 21, and in cooperation with a cable 26 these pulleys provide vertical positioning forces for the slide 11 on the carriage 13, as will be more fully described.

For each of the guide rods 12, added rigidity may be imparted by means of vertically spaced stabilizing brackets, as at 14', secured to the outer face of the carriage frame member 14. The bracket 14' has a narrowed projecting stabilizing end secured to a limited arcuate extent of the guide rod 12, and the guide bearings 22–23 for the slide 11 are of the slotted or open-mouthed variety so as to clear the stabilizing arm of bracket 14' and its vertically spaced counterparts; the number of such counterparts naturally depend upon the vertical dimension of the array of matrix. Similar offsetting brackets carried by the other upstanding frame member 15 serve the right-hand guide rod 12 for the retrieval-access slide 11.

Between the locations of pulleys 24–25, the base plate 21 is provided with spaced openings 27–28 to accommodate the guided insertion of retrieval devices projected through the openings 27–28 to contact and remove selected packaged items, one at a time, from inventory. The retrieval devices 29–30 are preferably relatively soft rubber-like (yieldable plastic or elastomeric) cups served by a vacuum system for developing temporary attachment to each successive item selected for removal, the vacuum being released upon sufficient extraction of the selected item from inventory. In FIG. 2, I suggest local provision of the vacuum supply at a motor 31 and vacuum pump 32, with suitable pressure indicator 33.

The motor, pump and indicator 31–32–33 may be carried as a separate sub-assembly on a mounting plate 34 secured to the vertically spaced bearing blocks 22–23 at one side of the slide 11. Conduit means 35 connects the vacuum pump to each of the two retrieval cups 29–30 by way of a crosshead or header 36 to which supporting stem pipes 37–38 for the two suction cups are secured; in the form shown, separate vacuum connections 39–40 from conduit 35 respectively serve the two retractor suction cups 29–30. It will be understood that, for the situation in which similarly dimensioned packages are to be retrieved from a single vertical plane, the suction cups 29–30 are of like proportions and that they may be positioned in a vertical plane common to the outer edges of cups 29–30; the retractor cups are projected into and out of the retrieval plane, in accordance with reciprocating movements of the crosshead 36.

Guide means for such reciprocation is provided by laterally offset rods 41–42 secured to the base plate 21 and connected, at their laterally outwardly projecting ends, by means of a tie-bar 43. Accurate crosshead-positioning alignment with respect to the guide rods 41–42 is assured by elongated bushings 44–45 constituting part of the crosshead 36 and extending substantially along the rods 41–42. Reciprocation on the guide means 41–42 may be determined by rotary displacement of a reversible electric motor 46, connected through reduction gearing 47 (FIGS. 4 and 5) to a lead screw 48, which in turn is journaled at its inner end in a suitable bearing 49 in base 21. The lead screw 48 continuously engages a follower nut or thread in the crosshead 36, and the outer end of the lead screw 48 is journaled by means (not shown) in an outer plate or bracket 50 secured by offsetting posts 51 to the base plate 21. The plate 50 serves additionally to mount the drive motor 46 so that the crosshead 36 and therefore the retrieval suction cups 29–30 may be selectively positioned in and out of access to the retrieval-access plane of the matrix.

A further opening 52 in the base plate 21 accommodates the projecting feeler or probe arm 53 of a limit switch 54 to detect the presence of a retracted package removed from the matrix by the retrieval means 29–30. The limit switch 54 may be utilized to shut off the vacuum motor 31 and thus to release the retrieved package at substantially the plane of the inner face of the base plate 21. A second limit switch 55 carried by the supporting framework 51 for the drive motor 46 has a probe or control arm positioned to intercept a bracket 56 carried by or forming part of the crosshead 36; this switch 55 determines a limit of retracting the crosshead 36, the motor 46 being disconnected and relay connections reset, to enable forward drive of motor 46 and restart of the vacuum-pump motor 31, upon actuation of switch 55.

A third limit switch 55' (FIG. 4) is also carried by the frame (51) of slide 11 and is poised to determine the full-forward position of crosshead 36, thus initiating reverse movement of retrieval cups 29–30 while vacuum pump 32 is operative. Electrical supply for the indicated and other functions of retrieval-slide operation is available by a flexible cable connection to the main frame of the carriage 13. This is schematically shown in FIG. 4 as a multiple-conductor flexible cable 57 suspended from a suitable bracket 58 on the bottom of the retrieval slide 11 and secured at its other end to a suitable offsetting bracket 59 carried by the lower member 17 of the main carriage. In FIG. 4A, the assurance of non-fouling supply of such multiple-conductor cable (which may be, and preferably is, a ribbon of side-by-side arrayed multiple insulated conductors) derives from a series of articulated links, shown in FIG. 4A in fully collapsed condition. The bottom link 60 is pivoted to a connecting plate or bracket 62 on the lower carriage frame bracket 59, and the multiple conductor elements are severally attached to a suitable terminal strip 63 on the bracket 59. The next link 64 is articulated to the link 60 at pivot 65, which may comprise a central rigid rod between like link elements 64 and surrounded by a nylon or the like sleeve, for better assurance against kinking the multiple-conductor flexible cable 57. Similar links are further interconnected to constitute the complete nest 66, and in each case the flexible cable is played over and around the protective sleeve at each point of link connection. The final course for the cable 57 is shown in FIG. 4A to be determined by the instantaneous orientation of the uppermost link 67, pivotally connected at 68 to the bracket 58 depending from slide 11. It will be understood that the upper end of the cable 57 may be connected to a terminal strip (not shown) similar to that shown at 63 but of course carried by or forming part of the retrieval slide assembly 11.

Basic electrical connection from the slide 11 to the control console 18 and to the drive means 19 is achieved by further similar multiple-conductor cable means 70 shown clamped at 71 beneath the bracket 59 and having its multiple conductors served by the terminal strip 63. In FIG. 4A, the lazy single curl of the cable 70 suggests that this cable stretches at least the full length of the matrix of FIG. 1 and is protected within a suitable trough, defined by upstanding sides 71–72 (FIG. 4) of a base channel at substantially floor level. With horizontal positioning of the main carriage, this ribbon of flexible multi-conductor cable 70 merely folds back on itself to allow for freedom of movement all the way to the right end of the matrix; the lazy curl of the cable unfolds as the carriage moves to the left.

With vertical positioning of the slide 11, one by one of the links of nest 66, beginning with the upper link 67, will be stretched to a point of interference between a stop lug 67' on each link with the side of the next link; this avoids any dead-center alignment of pivot connections for the next 66. Thus, one by one, an elongated zig-zag of connecting links is developed to permit such pay-out of multi-conductor cable 57 as is dictated by current vertical-positioning requirements of the slide 11. Also, upon lowering of the slide 11, one by one of the links extended from the next 66 will lie down in perfect alignment, without fouling the cable 57.

THE STATIONARY MATRIX STRUCTURE

The preferred matrix structure comprises a basic open shelving framework of girders supported on spaced feet 86. At each level, laterally extending arms, as at 87–88–89–90, position and serve to define upper and lower limits of each storage compartment. In this connection, angle members, as at 91–92, provide guiding flanges extending longitudinally of each compartment to make possible the guided insertion of removable storage-compartment units, containers, boxes or shelves, an illustrative one of which is shown at 93, in the lower compartment of FIG. 4. A similar box or drawer member 94 for different packaged items serves the upper compartment of the matrix column depicted in FIG. 4. At each such compartment, a supporting frame structure includes an upstanding marginal finger, flange or lug 95 for limiting forward insertion of each box or drawer 93–94. For all drawers 93–94, the forward end is open to provide access in the retrieval-access plane, the access being in each case to the endmost item 96 of the plural stacked items contained within the storage box 94.

For the situation depicted for the device of FIGS. 1 to 7, the stored items 96 are envelopes which package different dress patterns or the like for retrieval. Upper and lower resiliently mounted detent rods 97–98 associated with the access end of the box 94 serve to yieldably position the end-most item 96 for retrieval through the opening in the retrieval-access plane.

Retrieval is accomplished by projection of the suction cups 29–30 to the retrieval-access plane and into contact with the exposed outer face of the end-most item 96. At this point, suction developed by pump 32 establishes retrieval contact with and held upon the outer face of the package 96. Thus, upon retraction of cups 29–30 via the lead screw 48, the outer-most item 96 will be removed past detent means 97–98 in a displacement bodily to the right (in the sense of FIG. 4), to the point where the retracted item contacts and actuates the probe 53 for the limit switch 54. Actuation of switch 54 terminates vacuum pumping, and bleed means 29' (FIG. 4) at the suction cups enables prompt release to the vacuum and, therefore, of the hold of suction cups 29–30 upon the face of the removed package 96; it will of course be understood that the bleed means 29' may be of such small effective area compared to the vacuum-pumping capacity at 32 that suction-cup hold upon the package face 96 is effectively unimpaired by a constantly open condition at bleed means 29'. To further assure package release, the section cups 29–30 are retracted through the openings 27–28, so that the base plate 21 may react over a substantial exposed area of the retracted item 96, to force complete release of the suction cups 29–30 therefrom. The item then is free to drop in the available slot passage (to be described), vertically downward to the horizontally elongated guide trough defined by spaced upstanding sides 99–100 and by the continuously running package-removal conveyor belt 20.

It will be understood that each compartment or compartment box has its own resiliently loaded means 101 constantly urging the back end of the stack of inventoried items 96 to a point limited by detent-stop means 97–98. And once the last or outer-most end item 96 has been removed, it is immediately replaced by the next available item. Thus, if necessary to fill a particular customer's order, the lead-screw operated retraction mechanism can be repeatedly recycled to remove as many duplicates of the same item from box 94 as called for by the particular order.

MAIN-CARRIAGE SUPPORT STRUCTURE

Guided support for the main carriage 13 will be seen in FIGS. 3 and 4 to be provided by support rollers 75 suitably journaled at trunions 75', secured at horizontally spaced locations to the rear upper connecting frame member 16. Similar guide rollers 76, journaled at trunions 76', are provided at horizontally spaced locations with respect to the lower connecting frame members 17. The upper rollers 75 have flanges guided by an upstanding rail 77, which extends the full length of the matrix and is mounted upon an upper frame member 78 thereof. The lower rolls 76 are similarly guided by a rail 79 carried by a lower matrix frame member 80; rail 79 also extends the full longitudinal extent of the matrix.

An upper arm or offset 81 forms part of the upper carriage-frame structure 16 and extends rearwardly over the top surface or panel 82 of the matrix structure. This arm 81 supports (at its underside) a scanning head 83 forming part of the sensing mechanism for retrieval-access according to the invention. In FIG. 4, a heavy line 84 on the top panel 82 suggests one of a plurality of coded elements unique to each of the vertically arrayed stacks, A, B, ... Z already referred to.

THE TWO-COMPONENT DRIVE MECHANISM

Basic drive and positioning mechanism for the main carriage 13 and for the retrieval slide 11 are shown in simplified form in FIG. 6, wherein the vertical positioning cable 26 is identified in relation to the upper and lower pulleys 24–25 carried by the retrieval slide 11. This cable 26 is then played over spaced idlers 105–106 carried by the upper frame 16 of the main carriage. Cable 26 extends to the right (from pulley 105) to the far end of the matrix and into the drive module 19 (FIG. 1), at which region an upper pulley 107 at the elevation of pulley 105 reorients the cable 26 vertically for wrap-around engagement with the drive pulley 108, operated by vertical drive motor 109.

The drive pulley 108 is preferably an enlarged cylinder with a helical groove accommodating at least one full turn of the cable 26 about its periphery; as more or less cable is passed by the pulley 108, the longitudinal location of wrap-around on pulley 108 will displace accordingly. The longitudinal extent of the helix which characterizes pulley 108 must, of course, be sufficient to accommodate the full possible vertical positioning travel of the retrieval slide 11. However, the range of angularity for vertical cable connection to pulley 108 need have no detrimental effect upon vertical-drive efficiency if suitable tensioning provision is made at one end connection of cable 26, as at 115' (to be described).

Once having wrapped around one or more leads or turns of the pulley 108, the cable 26 extends vertically down to the bottom of the matrix at a further idler pulley 109 so that a bottom course of the cable 26 may extend to an idler 110 mounted on the lower frame member 17 of the main carriage. Idler 110 is one of a pair which also includes idler 111, matching the pair 105-106 already described for the upper frame member 16 of the main carriage 13. Pulley 110 guides cable 26 vertically to pulley 25 on the retrieval slide 11. Cable 26 is then returned downwardly to idler 111 for payout to the full other lateral extent of the matrix, namely, to the left-end frame member 112. Anchorage of the end of the cable 26 is shown at 113, after passing an idler 114 aligned with the idlers 109-110-111.

Tension take-up provision at turnbuckle 113' assures adequate drive friction at the point of wrap around on the drive pulley 108. In similar fashion, the other end of the cable 26 is secured to the left-frame member of the matrix at 115 after passing over idler 116 which is, of course, aligned with the other upper idlers 105-106-107; the spring 115' assures substantially uniform tension preload on the cable 26. It will be seen that a particular direction of rotary displacement of the motor 109 will achieve a correspondingly raised or lowered position of the retrieval slide 11. Such positioning, once achieved, will be maintained regardless of the longitudinal displacement of the carriage 13.

The horizontal component of retrieval-slide positioning may be accomplished by a single cable 117 secured at one end to the left main-carriage frame member 14, a turnbuckle being shown at 118 to permit tension adjustment as necessary. Preferably, the point of connection of cable 117 to the frame member 14 is substantially the vertical mid-point, so as to minimize possibility of misaligning the main carriage when subjecting the same to accelerating and decelerating forces. From the point of connection of cable 117 to frame member 14, the cable stretches horizontally to a remote frame-mounted idler 119, followed by a downward course to a base-mounted idler 120, so that an elongated horizontal stretch may return the cable all the way to the right within the drive module 19 (FIG. 1); there, a base idler 121 conducts the cable upwardly to a further idler 122 at the level of connection to the main slide or carriage 13.

Adequate drive friction to translate the output of horizontal motor 123 into cable displacement is achieved by a multiple-groove drive pulley 124 and a similarly formed idler pulley 125, between which several courses of the cable 117 are stretched. Thus, cable 117 from pulley 122 first rides a lower groove in idler 125 to pass back over a first or lower groove of the drive pulley 124, whereupon it is reversed in similar recycling fashion to take in plural complete loops between the spaced pulleys 125-124. After several such loops of engagement with these pulleys, the remainder of cable 117 is tied to the right-hand upper frame member 15 of the main carriage at a central location 126, in the manner described at the point of connection to frame member 14.

Thus, depending upon the direction and extent of drive inputs from vertical motor 109 and horizontal motor 123, any combination of vertical and horizontal displacements may be imparted to the slide 11, so as to position the same opposite the storage compartment from which retrieval is desired. And, as previously noted, vertical and horizontal positioning movements are independent of each other, regardless of the instantaneous vertical or horizontal position (or positioning movement) of the slide 11.

To complete the description of the drive mechanism of FIG. 6, a left-end-limit switch 127 is shown carried by the matrix frame member 112 and poised to intercept approach of the carriage slide at the left extreme limit of the matrix. A similar limit switch 128 is carried by a frame member 129 at the right end of the matrix, to electrically identify main-carriage travel to the right extreme of the matrix. In similar fashion, a lower limit switch 130 on the carriage frame member 17 is poised to intercept the retrieval slide 11 for its lower-most position, and an upper limit switch 131 on the upper frame member 16 of the carriage electrically identifies the instant when retrieval slide 11 achieves its uppermost position.

EXTRACTED-PACKAGE GUIDE MEANS

Novel guide means coacting between the retrieval slide 11 and the main carriage 13 are provided to conduct extracted packages to the conveyor system 20, regardless of the location at which extraction takes place. For this purpose, the retrieval slide is constructed as a relatively thin vertically-open, box-like structure in which the base panel 21 constitutes essentially one upstanding side face. End panels 135-136 are secured to the upstanding edges of the panel 21, and rigidity is imparted by longitudinally extending upper and lower frame members 137-138 forming part of the base 21 and spanning the total width of the slide between end panels 135-136. Preferably, one corner or edge of each of the frame members 137-138 is recessed so that, when fitted to the panel 21, the inward or inner face of the panel 21 will be effectively flush with the adjacent faces of the frame members 137-138, thus affording smooth and continuous exposure to the retracted package for ready removability and release.

Spaced behind the upper and lower frame members 137-138, and serving to define the back elements of the box-like base of slide 11 are two similar frame members 13939-140, which connect corresponding back edges of the side panels 135-136 and which frame an open back side of the box-like structure of slide 11; the rearwardly offset placement of members 139-140 leaves open slot-like passages at the upper and lower edges of this box-like structure. A funnel or deflector shaped member 141 (FIGS. 3 and 4) carried by the lower frame member 140 extends between the side panels 135-136 to make sure that removed and released packages 96 will freely enter and pass the discharge slot between frame members 138-140.

Further in accordance with the invention, vertically elongated guide means are provided for released retrieved packages, all the way to the horizontal conveyor means 20, whatever the vertical position of slide 11 at the moment of release. For this purpose, guide-cable loops are are provided with vertical stretches forward and back of the location of release and spaced at appropriate distances across the span which comprehends the released packages. In the form shown, four laterally spaced cable-pair alignments serve this purpose, i.e., four cable alignments forward of the release plane and four cable alignments to the rear of the release plane.

The vertical frame members 14-15 of the main carriage 13 are preferably box girders having hollow interiors to accommodate return lengths of the guide cables. Thus, first, second, third and fourth guide cables 145-146-47-148 are shown fixed at suitable spacings along the length of the rear bottom frame member 140 of the slide 11 (see FIG. 3). Each of these cables, such as the cable 145, has a first vertically downward course to first and second idlers 150-151 journaled in the lower frame member 17 of carriage 13; idlers 150-151 serve laterally to displace the return course of the cable to vertical alignment within the cavity of the nearby box-girder frame member 15. Thus, the continued payout of the cable 145 proceeds via idlers 150-151 to an upwardly stretched course 145' within girder 15 and extending all the way to the top frame member 16. At this upper elevation, similar idlers 152-153 enable the cable 145 to be laterally offset to the right, with a downward course terminating at the upper frame member 139, in alignment with the point of connection to member 140.

It will be understood that all courses of the guide cable 145 are in the same vertical plane and that tension adjusted at either the member 139 or the member 140 will remain, whatever the vertical position of the slide 11. In similar fashion, the next cable 146 is guided by pulleys 154-155-156-157, and by way of the hollow interior of the girder 15, to establish another spaced alignment of vertical guidance for released packages. The remaining guide cables 147-148 are served in similar fashion by further idler pulleys in the upper and lower frame members 16-17 and by the interior space of the firder 14; such guide cables will be understood to be connected under suitable tension to the upper and lower rear frame members 139-140 of the retrieval-access slide 11.

A similar array of four guide cables is provided immediately forward of the plane of release of selected packages, and because of the similarity and duplication of parts involved, the forward set of cables is identified by reference numerals corresponding to those of the described rear set, except for the use of primed notation. Finally, to assure unfettered passage of released packages past the lower pulley locations, as for the pulley 154 shown in FIG. 4, I provide a suitable funnel-mouthed fender 160 surrounding the pulley 154 and having suitable openings (not shown) for passage of the cable 146 therethrough. Package discharge from the slot opening between fender 160 and its counterpart 160' is direct into the conveyor slot defined between upstanding panels 99-100. It will be understood that the relatively close spacing between the rear guide-cable set and the forward guide-cable set is such, in relation to the retrieved-package vertical dimension, that generally upright orientation of each successive package is maintained throughout its downward fall, and that this orientation is preserved by the relatively narrow space between walls 99-100 as the package is thereafter horizontally conveyed by belt 20.

VERTICAL-SCAN ELEMENTS

To implement the vertical positioning of the slide 11 adjacent the desired compartment within the matrix, each compartment is identified with suitable code which may be read by a horizontally elongated, vertical scanning head 161 mounted on a bracket 162 carried by the end panels 135-136. Scanning head 161 is shown optically depressed, as suggested by the alignment 163 (FIG. 4), and positioned in close adjacency to a scanning plane which (on vertical displacement of slide 11) will intercept codes applicable to individual compartments, belonging to any given vertical alignment of row A or B, or Z within the matrix. Such codes may be imprinted on the outer exposed face of each of the packages, such as the package 96, in which case the scanning head would be positioned slightly lower than shown, but nevertheless in clearance relation with the retrieval mechanism and probe 29-30-53. On the other hand, in the preferred form shown, the character identification for each compartment is applied to the frame itself as to angle members 164-165-166 in the same upstanding plane of the matrix. Heavy markings in FIG. 4 applied to the vertical face of such frame members 164-165-166 will be understood to identify coded panels or labels scanned by the head 161 during its vertical traverse movement. The panel of coded markings shown in FIG. 4 to be instantaneously observed by the scanning head is identified at 167.

STORAGE BOX DETAIL

To complete the description of the storage boxes 94 for duplicates of particular inventoried items, each such box may be self-contained with its own resilient means, such as a loosely coiled spring 170, compressionally acting on the back panel or slide 101 which loads the stack of items to be retrieved. The rear of spring 170 reacts against a false-back panel 171 spaced from the rear panel 172 of the box. Contained within that space is a simple latch or dog 173, which may be gravity-operated and in the "down" position may engage and locate within a suitable slotted opening in the horizontal guide 92 which supports one side of the box. Finger-access through an opening 174 (FIG. 5) at the back panel 172 provides means for ready release of the dog or latch 173, as when necessary to remove the box 94 for replacement.

Within the space between the false bottom 171 and the back panel 172 a torsionally-sprung tape pulley 175 (FIG. 4) is suitably mounted to take up a tape 176 in tension, across vertically spaced idlers 177-178 and against a window 179 in the back panel 172; torsional-spring action at 175 will be understood to be weak compared to compressional loading by spring 170. The upper idler 178 is preferably vertically centrally positioned and is paid out for attachment to the back side of the loaded back or slide panel 101 for the stack of items to be retrieved. A diagonal stripe or pattern division between contrasting wedges 180-181 on the tape is so longitudinally located along the tape that, at any given instant of time, a rough metering display will appear at the window 179, to indicate the extent to which packages have been retrieved from the box 94.

Thus, for a fully stuffed or loaded box 94, the darkened region 180 may be of zero extent (or substantially zero extent) across the width of the tape and therefore just barely visible at one edge of the opening 179. As more and more packages 96 are retrieved from the box 94, the spring 170 urges the loading panel 101 forwardly in the box, paying out more of the metering tape. With advance of the tape past the window 179, the darkened lateral extent at window 179 appears greater until such time as the last item 96 is retrieved, when the darkened region completely occupies the window 179. Operating personnel are thus forewarned, in advance, as to the degree of exhaustion of the contents of any given box so that the box may be replaced with a fully loaded one, and down-time of the machine may be minimized.

CONTROL COORDINATION

The basic control and supervision accomplished by the console 18 may assume a variety of forms; in connection with FIG. 7, I merely indicate for illustrative purposes a suitable functional interrelation of control, scanning, positioning and retrieving operations.

Suffice it to say that the console 18 may include provision for an operator to punch-code a tape of known configuration so as to provide a basic input which can be scanned, interpreted and operated upon by the system of the invention. Having formed such a tape, the console 18 may include provision for automatic reading of the tape, as suggested in FIG. 7 by the tape reader 185. The tape reader 185 will be understood to include provision for manual start, as indicated by legend, and for recycled start, provided by indexing of the tape (or by accomplishment of automated functions), as suggested by the control connection 186.

The output of the tape reader 185 is shown supplied to buffer-storage means 187, which may comprise a network of bi-stable solid-state circuits, for code retention. In a separate line 188, a horizontal-start command signal is applied to horiztonal scan-motor control means 189. This initiates operation of the horizontal drive motor 123, as by exciting a horizontal-motor amplifier 190.

The connections for exciting motor 123 will, for the preferred arrangement, be understood to have been left in a condition to drive the horizontal motor for a right-to-left traverse of the matrix displayed in FIG. 1. This applies whatever the position in which the main carriage 13 may have been stopped after its previous operation. In other words, if, after completion of a package-extraction cycle, the carriage 13 happens to be left in the position shown in FIG. 1, then upon initiation of a new cycle of operation (as by manual starting, at 185), the horizontal-drive motor 123 will be operative to displace the carriage 13 in a first traverse to the left. If the horizontal scan (by head 83) is ineffective to pick up recognition of a desired column of storage compartments during this first traverse, then the carriage 13 will quickly reach the left end of the matrix (i.e., the column Z), at which point the carriage will actuate the left-end limit switch 127. In FIG. 7, switch 127 actuates the horizontal scan-motor control 189 to reverse the traverse, meaning that the slide 13 is then traversed from left to right, and if necessary, all the way to the "Stop Limit" switch 128 at the right-hand end of the matrix. The stop-limit switch 128 is also shown in suitable controlling relation with the horizontal scan-motor drive system so as to shut down horizontal scanning, once limit switch 128 is actuated.

In the normal course of events, however, the tape will have been properly encoded, and so there will come a time, during either the leftward or the rightward traverse for the horizontal drive, when scanning mechanism carried at the upper arm 81 will recognize the desired column of storage compartments.

Such recognition is accomplished at a horizontal coincidence-detector circuit 191 having a first input characterized by the code supplied by the buffer storage 187, and a second input from the horizontal scanning head 83 (carried by the upper arm 81); coincidence detector 191 responds when scanner 83 picks up a signal of code matching that provided by the buffer storage 187. Coincidence recognition will be understood to deactivate the scan drive or in any desired manner to cause the horizontal scanning mechanism to pass, reverse, and otherwise "home-in" on the recognized column identification. Once the main carriage has completely homed-in, the horizontal drive will be deactivated, and the directional control for the next cycle of horizontal drive will have been reset so as to start the next horizontal scan, in the right-to-left direction as already described.

"Homing-in" on the horizontal scan is also effective to initiate a vertical start command as suggested at 192 for operation of a vertical scan-motor control circuit 193, in a manner similar to that explained in connection with the horizontal drive. A vertical motor amplifier 194 is thus activated by the vertical-start command, in a predetermined direction of drive for motor 109, to vertically position the slide 11. Preferably, this direction of initial scanning drive for the slide 11 is downward, whatever the initial position of the slide 11 in its guide. If the downward traverse is ineffective to accomplish recognition of the desired vertical-position code, the slide 11 operates the bottom limit switch 130, labelled "Reverse Limit", meaning that switch 130 is effective on the vertical scan-motor control 193 to reverse the direction of vertical traverse. Traverse then continues upwardly until, if necessary, a full vertical traverse is accomplished upon striking the "Stop Limit" switch 131.

It will be understood that limit switch 131 is only called into play if, through some unforeseen circumstance, character recognition is not accomplished on this second and upward vertical traverse by the slide 11. Under normal circumstances, however, (i.e., assuming correct encoding of the tape, consistent with the available coded items in the inventory of the matrix), code recognition will have been achieved by the vertical scanning head 161 somewhere during either the downward or the upward pass of the slide 11. Again, the code-recognition condition is noted by a coincidence-detector circuit 195 which has one input conditioned by the instantaneous relevant information in the buffer storage 187, and another input reflecting the instantaneous scanned code observed by the vertical scanning head 161.

Again, the detection (at 195) of coincidence between the desired code (available from storage 187) and the recognized code (at 161) is effective to initiate vertical-traverse homing at the desired elevation within the matrix. Upon achievement of homing, detector 195 is operative on the vertical scan-motor control to shut down vertical scanning. At the same time, detector 195 is operative in conjunction with detector 191 (as through a suitable "AND"-recognition circuit at extractor control 196) to initiate the operation of the extractor mechanism, which has already been described at motors 31–46 and positioning limit switches 54–55. In view of the nature of control circuit 196 to require both horizontal-scan recognition 191 and vertical-scan recognition 195 prior to actuating the extractor mechanism, and since the overall system provides no other way to automatically operate the extractor mechanism, the circuit 196 may be viewed as means controlled by the coincidence-detecting means 191-195 for interdicting item-retrieval in the absence of detected coincidence.

A further synchronizing input 197 from buffer storage at 187 assures that the extractor mechanism will be operated for the correct number of cycles, depending upon the number of repeats of the same item that must be retrieved from a given inventory compartment to fill any given order. For this purpose, an extraction counter 198 operates once per cycle of the extractor mechanism, as for example upon each actuation of the "Stop Limit" switch 55. And only when the extractor-control circuit 196 recognizes that the required number of items has been extracted for any given two-coordinate positioning of the slide 11 will the extractor-control circuit certify (in line 186) that the mechanism can be recycled at the tape reader 185, to read-in the next input order from the taped program to which reader 185 is exposed.

Quite aside from the extraction process just related in connection with FIG. 7, it will be seen that the mechanism lends itself to the generation of additional information, useful in the processing of customer orders. For example, the code which is scanned for recognition may include several additional digits of information not necessary to develop position recognition, but nevertheless unique to each compartment of available packages and identifying something of commercial significance, such as the price code for the particular item. Such data can be picked up either at the horizontal scanning head 83 or at the vertical scanning head 161 (or at both locations) and the information supplied via lines 199-200 to suitable processing means labelled "Information Amplifiers" 201, for supply to a form printer designated 202. Printer 202 may have an additional connection to the output of the extraction counter 198, as for example to enable printer 202 to automatically compute remaining inventory, or price totals (based on unit price scanned at 83 or 161, times the number of extractions counted at 198). The block 202 will be understood to schematically depict a variety of devices or operations, of which form-printing is merely illustrative; for example, the block 202 may also include tote-box indexing or other handling synchronization for coordinating the placement of a tote box 20' in and out of the package-collection position shown in FIG. 1, to the end that each customer's collected packages will be correctly segregated.

MODIFIED CONTROL CIRCUIT

The described cycling operation in connection with FIG. 7 will be seen to lend itself flexibly to further desirable employments in an automatic retrieval system of the character indicated wherein relatively heavy demands may be anticipated for certain of the items available from the different storage-compartment means. For example, a certain size of a certain style may be known to be in particularly heavy demand, as compared with certain other styles and sizes. In such case, it may be desirable that two or more adjacent compartments be provided with further pluralities of exactly the same item.

Two or three storage boxes of the character described at 94 may be vertically arrayed in adjacency and in the same column alignment (or elsewhere in the matrix). When the prescribed scan pattern is followed by the system, the scanning mechanism will primarily home on a first of these duplicate compartments; this will continue as long as an available supply of items remains at that location. But should the supply become exhausted, as may occur during the filling of a particular customer's order for that size and style, the mechanism lends itself to the automatic indexing of the retrieval-access slide 11 to the next available loaded compartment containing the same style and size item. Extraction will proceed at that next available spot until such time as the customer's order for the item has been filled. An illustrative circuit arrangement to accomplish this function is illustrated in FIG. 7A, wherein slightly greater schematic detail is given for certain elements of the extractor mechanism.

In FIG. 7A, extractor mechanism is seen to include the vacuum pump, motor and its relay at 31; their function may be initiated when or before the forwardly projecting cross-head 36 intercepts the forward limit switch 55', meaning that the suction cups 29-30 have been fully forwardly projected and reverse or retracting displacements are being initiated. Now, if the supply of packaged items is exhausted, there will of course be no item withdrawal for the particular cycle of the extractor mechanism, and therefore the limit switch 53 will not be operative to shut off the vacuum system 31 (or to count out another withdrawn item at counter 198) during the retraction phase. This means that the vacuum system will still be running when the crosshead 36 reaches the fully retracted position, determined by limit switch 55. In FIG. 7A, I show provision of an "AND" circuit 203 to recognize this concurrence of events; namely, pump-motor and relay 31 still operative, at the time when limit switch 55 is actuated. The "AND" circuit 203 is shown effective, on such concurrence, to initiate a vertical-recycle command to the vertical scan-motor control 193 (and at the same time to issue a suitable "alarm" signal, suggested by legend). Recycled vertical scan brings the slide 11 to the next compartment containing more of the same desired item, and continued extraction proceeds until the desired number of items has been counted "out" at 198. The operator is meanwhile warned by the alarm to restock the exhausted compartment, and further automatic item retrieval can proceed while he is replenishing the exhausted compartment. Once the compartment has been replenished or replaced, the machine will be able to favor the now-replenished compartment, in further retrieval of the same item to fill subsequent order requirements.

CODES AND THEIR SCANNING

The particular scanning heads utilized in the device thus far described form no part of the present invention and may be selected from a variety of systems. However, I indicate my preference for the optical reflection-recognition binary-coded variety described in greater detail in my copending application, Ser. No. 680,642, filed Nov. 6, 1967, entitled "Random Access Store For Cards, File Folders And The Like"; said application is a continuation-in-part of my original application, Ser. No. 430,330, filed Feb. 4, 1964. In such a system, code labels to be scanned and recognized by the scanning system are broken down into elemental digits, comprising a mixture of binary and decimal code.

According to this system, as I have employed it in my use of the present invention, the decimal digits follow those already in use by the customer, so that minimum education of customer personnel is involved in use of the invention. Thus, for example, in the case of dress patterns, for which the customer may have a three-digit decimal code to designate style, it is important to the customer to be able to set up the coding of my machine so that his operators can visually recognize the decimal digits in the code. However, in order that the machine may gracefully handle such coding, it is desired to employ the simplest possible system which is, of course, a binary code. The compromise is reached by limiting the binary display for each decimal digit to the requisite four-bit binary. Thus, with twelve bits, the customers's three-digit decimal code may be displayed, for binary-code recognition by the scanning mechanism. FIG. 8 illustrates an application of this kind of code.

FIG. 8 is very much diagrammatic, but is intended to illustrate within the confines of phantom outline 205 a particular illustrative coded label unique to a particular one of the various columns A, B, . . . Z in the matrix, column B being that selected for illustration. Such coded labels are shown at 84 in FIG. 4 to be applied, as by gummed-tape technique, to the top surface 82 of the frame of the matrix, and each such label 205 is elongated from front to back of the matrix in the alignment depicted for the label 84 in FIG. 4. The horizontal spatial positioning of each such label 205 for its particular column will be determined by the location of the arm 81 in respect of the vertical alignment of the retractor mechanism 29–30; and each such laterally spaced alignment for a different one of the column-identifying code labels 205 is correctly positioned for its column, so that there are A, B, . . . Z different labels, of which the label 205 illustrates one.

In like manner, vertical-scan code labels, as at 167 in FIG. 4, are illustrated at 206–207–208 in FIG. 8. The code alignment typified by label 206 may be for a first set of shelves or rows, such as shelves 8 to 11 ("*h*" to "*k*"), a second and slightly offset set of labels, typified by the label 207, is applied similarly to identify shelves 4 to 7 ("*d*" to "*g*") in the same vertical array of shelves; and, finally, a third and further offset array of labels, typified by label 208, is employed to identify the shelves 1 to 3 ("*a*" to "*c*") in the same vertical stack. It will be understood that all labels 206–207–208 apply for the single column (B) designated by recognition of the horizontal-traverse coded label 205 in FIG. 8.

For greatest flexibility of implementation (as far as the customer's viewpoint is concerned), it is referred that each column shall be uniquely applicable to more than one style at a time, so that each column is not limited to the accommodation of merely one style within the customer's current offerings. Thus, for ease of set up, and assuming that style is to be the basis of initial recognition by the scanning system, more than one style must be recognizable at any given column in the course of horizontal scanning in the matrix. For the arrangement of FIG. 8, three such different styles are recognizable by the horizontal scanning mechanism. Since the illustrative example is for recognition at column B, these three styles are identified B', B'', B''', respectively, in side-by-side adjacency, in terms of the horizontal-scan direction.

The customer's style identification is assumed to require three decimal digits, and as explained, each of these digits is displayed for machine recognition purposes as a four-bit binary code, so that "style" requires twelve binary-digit bits. The first decimal digit for Style B happens to be shown as the decimal numeral "9", requiring the four-bit binary code of a "white" followed by two "blacks" and another "white". The next decimal digit is the number "4", requiring a four-bit binary comprising a "black", a "white" and two "blacks". The final digit is the number "8", requiring a "white" followed by three "blacks". With very little education an operator can thus recognize each of the three binary displayed decimal digits as the "9", the "4", and the "8 " of his "Style 948" with which he is presumably familiar, through past knowledge of his company's operations. This, then, is the first style accommodated in the bank B of the matrix.

The next style (designated B') will be recognized by its displayed binary code as involving "Style 224", and the third style code (accommodated by the offset alignment B'') represents "Style 465".

Now, when the buffer storage 187 receives its code input from the tape reader 185, and assuming that one of the styles B, B', B'' ("948", "224", "465") from column B is desired, the buffer-stored code (at 187, FIG. 7) will be one of the three codes displayed in FIG. 8, depending upon the desired style. Horizontal traversing scan will proceed as described until one of these three codes is recognized (coincidence; detected at 191, FIG. 7). At this point, the scanning mechanism begins to rely upon a "centering" element (at region 205' in the displayed code) whose sole purpose is to assist home-in functions.

The scanning head may incorporate sufficient capacity for resolution of additional binary bits and in the case illustrated for the label 205, two such decimal digits are interpretable, there being four binary bits to identify each such digit. These two additional digits may represent price for the item to be retrieved. Thus, the decimal number "48" denotes "price" for "Style 948" in column B; the decimal "22" illustrates "price" for "Style 224" in column B'; and the decimal "59" designates "price" for the "Style 465" in column B''. Such information has nothing to do with positioning control but may be accommodated gracefully by the scanning mechanism so as to enable the supplementary furnishing of information, as for example to the form printer 202 (FIG. 7) which may be a part of the billing mechanism adopted by the customer.

It will be recalled that depending upon the particular one of the three codes B, B', B'' recognized upon horizontal traverse of the main carriage 13, homing alignment will be achieved on the centering stripe 205' unique to that system. Thus, traverse positions 210–210'210'' will be understood uniquely to identify home-in on the desired one of the three style codes in the matrix column. For a home-in on the alignment 210, all vertical scanning operations will have been geared for recognition of labels vertically aligned with the label 206; for the assumed condition shown, this alignment applies for shelves 8 to 11. Thus shelves 8 to 11 may be stocked with different sizes of "Style 948", and one such size code is illustrated by the label 206 (for shelf 10) as being identified by three decimal digits, readable as "size code 509". With vertical scanning of size codes for the style accommodated by labels aligned with label 206 (shelves 8 to 11), there will be a recognition of and vertical homing-in on a horizontal centering mark, such as the stripe 206', centered on the alignment of the label 206. Similarly, for "Style 224", (column B'), which is accommodated by labels aligned with label 207 at shelves 4 to 7, vertical scanning may develop recognition of and vertical homing-in on the centering mark 207' on the alignment of label 207 (shelf 7) for which the size code depicts "Size 421". In like manner, for the "Style 465" spread of sizes, labels aligned with the label 208 are recognized on vertical scanning, and homing is achieved at an appropriate centering mark, such as the stripe 208' for shelf 2, which happens to display the same size code, namely "509", as that displayed at shelf 10, but, of course, for a different style.

It will further be understood that in the manner described in connection with horizontally scanned code labels, such as the label 205, additional digits of information may be provided at the vertical scan labels 206–207–08. These do not happen to be shown in FIG. 8, but provision for their readout is suggested by the output line 199 already described in connection with FIG. 7.

OVERALL OPERATION, SUMMARIZED

To recapitulate the operation of the overall system, an operator seated at the console 18 punches in successive order data from customers. This is encoded on tape contained within the console 18 and forming no part of the invention. A tape reader successively scans different indexed portions of the tape at 185, transfers required recognition data into the buffer storage 187 and initiates the first component of scanning, namely, horizontal scanning. This occurs until the correct vertical column is recognized and the carriage 13 positioned in a homing operation. At certification of home-in on the horizontal traverse, the vertical traverse is initiated and pursued, until home-in on the selected vertical row or shelf location. For each column, this recognition will have occurred for one of a plurality of styles recognizable at that column, and no ambiguity will have been introduced because the scanning mechanism operates at random in its recognition of a particular code, be it on the horizontal or on the vertical traverse.

Once having achieved the desired location within the matrix, all scanning stops, and extraction cycles are pursued automatically to completion. Other functions proceed to completion, as for example address-printing, bill or other form printing at 202; when these functions have been completed, certification is furnished in line 186 for the next index of the tape reader 185 to service the next customer order or the next item ordered by the same customer, as will be understood. In every case, all items extracted are cleanly removed and dropped in a non-fouling conveyor system for accumulation at the retrieval bin or tote-box 20' and, if desired, the retrieval bin itself may be automated (by means not shown) so as to place at the location 20' in FIG. 1 a new bin for each new customer's order.

MODIFIED MATRIX CONFIGURATION

The preferred form of the invention is that which has already been described, namely, the two-dimensional matrix involving an upright two-dimensional retrieval-access plane. The banks may be as extensive vertically, and the elongation may be as extensive horizontally, as space and customer limitations may dictate or permit. In FIG. 9, I illustrate that principles of the invention are not only applicable to a two-dimensional single plane retrieval surface matrix of the character thus far described, but also to a matrix in which the surface may have curvature, as for example the inner surface of an annular shell in which one dimension of scan is vertical, and the other dimension angular, about the axis of the storage matrix.

Such a system is depicted in FIG. 9, wherein the annular matrix of storage compartments is something short of a full 360° of arc, so that access may be had to the interior volume, in order to facilitate external removal of retrieved items and also to facilitate service access. In FIG. 9, the vertical banks of storage compartments are designated A, B, . . . S, in succession, angularly about the axis of the structure; and shelf levels for each bank are identified $a, b, \ldots g$, so that the plurality of storage compartments available for the form of FIG. 9 is represented by the product $Sq$. As with the form of FIGS. 1 to 8, the basic matrix is a shell of shelf guides, and individual drawers or boxes of packaged items as at 220 are received by radially inward insertion from the outside of the annulus. In each case, as with the already disclosed form, suitable stops limit box insertions, to provide correct location for pick-off in accordance with the invention.

The two dimensions of scanning and positioning to achieve selective pick-off in FIG. 9 are (1) angular motion in a given horizontal plane, and (2) vertical traverse after acquisition of a selected angular position. The scan and retrieval head 222 is generally indicated at the end of an arm 218 extending radially from the rotatable supporting stem 221. Angular-position codes may be applied at spaced locations around a base or ledge 219, swept in the course of rotation by a support arm 226 for a radially oriented downwardly facing scanner head (not shown) but carried beneath arm 226 at radii to scan angle-identifying code labels at 219. Army 226 is secured to a rotatably mounted tubular support 225.

In certain cases, it is useful to have arm 218 extend diametrically across the matrix, in which event, like scanning and pick-off or retrieval devices 222–223 may be provided at the respective ends of the rotated arm 218; thus devised, arm 218 may accomplish the rotary dimension of scan at an average speed approaching twice that achieved for the form of FIG. 1, since each retrieval head 222–223 serves but half of the matrix, and the head (222 or 223) which first achieves recognition of the desired angle-identifying code will be the head which arrests rotary traverse of the arm 218.

Rotary traverse is shown to be accomplished by angle-positioning means 224 having rotary-drive connection to he tube or outer driveshaft 225, which may be for the most part supported in or beneath the floor level, with a short projection above floor level to drive the angle-scanning arm 226. The stem 221 has a keyed connection with the bore of the outer shaft 225 and may be vertically adjustably positioned, to perform a vertical scan. Vertical scanning is by scanners at 222–223 as stem 221 is displaced by elevation-ositioning means 227. The elevation-positioning means is activated upon certification that the angle-tracking function has been accomplished and the correct column of storage compartments identified. Once the correct elevation has been located, the retraction or retrieval process may proceed (at 222 and/ or 223) as has already been described for the FIG. 1 matrix.

To complete the description of parts in FIG. 9, 228 identifies suitable control means whereby the correct scanned digit is recognized against the selected digit input, to determine homing functions for each of the two dimensions of scan and positioning. It will be understood that FIG. 9 is only a schematic representation and that therefore for purposes of simplicity certain parts have been omitted but that they can be readily provided; thus, suitable guides may serve released items retrieved at 222–223.

ENCODED-PACKAGE SYSTEM

It has been generally indicated above that for certain applications of my invention it is desirable to have all or an important fraction of the coding information (to be scanned) printed upon and therefore as an integral part of each package to be retrieved. FIGS. 10 to 12 illustrate such an application, where both scan components of the coded information are printed on each individual package, such as the envelope package 230 in FIG. 10.

In FIG. 10, the identifying price and size codes, applicable to package 230, are printed in the same single horizontal alignment, which appears near the upper edge of the back side (closure-flap side) of the envelope. The back side is preferred because no other pictorial or descriptive information need be present, the information of interest to the ultimate customer being reserved for the other side, namely, the front face (not shown) of the envelope package. The applicable style code is presented vertically, near the left margin of the back side shown. For the situation depicted, package 230 contains a pattern of Style "465", Size Code "509", and unit price "48".

Let it be assumed that each column contains merely different sizes of the same style, and that any given search-scan cycle will commence with the retrieval slide 11 at one of the correct vertically positioned retrieval elevations a, b, . . .k, the same remaining from accomplishment of the previous retrieval operation. Under these circumstances, the described initial horizontal scan for correct column location can be accomplished by a single vertically arrayed scanner 231 carried at the left margin 136 within the box-like base of the retrieval slide 11 (fig. 11), because for each exposed package in each column, the displayed "-STYLE" code will be the same. For slant-aspect observation of the horizontal-scan code ("STYLE"), the viewing or response axes 232 of scanner 231 may be positioned clear of the horizontal projection of package 230 and optically aligned directly at the location of the "STYLE" code on the front package 230 for the stack in box 94; in FIG. 11, the heavy mark 232' identifies the printed-package code scanned by the optical alignment 232..

In similar fashion, FIG. 12 shows provision of a vertical scanner 239, which may be similar to that described at 161, except of course for provision of adequately arrayed code-sensing elements to embrace both the price and size codification printed on package 230. The heavy mark 238' in FIG. 12 identifies the code scanned by the response alignment 238, for vertical scanning.

It is thus seen that, in the manner described in connection with FIG. 7, horizontal scan and vertical scan, followed by item withdrawal and release, can proceed with the system of FIG. 10 to 12, as long as the same style is present in all compartments of a given vertical column. In FIG. 13, I show that this is no real handicap, for the basic traverse drive control may incorporate preselected vertical-range information, enabling accommodation of plural styles, appropriately grouped by size, in each column.

In the diagram of FIG. 13, it is assumed that three styles are the most that is being accommodated in a given vertical column in the matrix. At three preselectors 245–246–247, I indicate that a first bank, from row "d" down, is served by a first preselector 245; a second bank, from row "h" down (to row "e"), is served by a second preselector 246; and a third bank, from row "k" down (to row "i") is served by the third preselector 247. Buffer storage 187, and vertical motor devices 193–194–09 are as previously described, but they are shown in FIG. 13 because of their additional functions, to be described. All other connections and functions described for FIG. 7 will be understood to apply when the connections of FIG. 13 are used in FIG. 7, except that the horizontal-start command is not initiated until the basic row-group preselection function has been achieved. Thus, the horizontal-start command in FIG. 13 is schematically indicated at 248 as issuing from an additional output of the vertical scan-motor control 193.

Tape-reader input to buffer storage 187 is as previously explained, except that further punched-code data will have provided characterization for selected activation of one of the preselectors 245–246–248, shown connected in common to an output of the buffer storage means 187. The start command, for row-group preselection, is issued by the tape reader in line 249 (in place of the command previously described at 188 in FIG. 7). A position-following device, such as a helical potentiometer or commutator 250, tracks vertical position corresponding to instantaneous elevation of slide 11, and depending upon the row selected at 245–246–247, control 193 will evaluate desired position in terms of actual position until one of the preselected rows "d", "h", or "k" is attained for slide 11. Achievement of this preselected elevation initiates the horizontal-start command at 248, and traverse-scans proceed, first horizontally, then vertically, as previously described. Of course, by having initially vertically positioned slide 11 at the highest row ("d", "h" or "k") for the desired "-STYLE", the vertically down initial traverse of slide 11 will either find slide 11 at the correct package-retrieval opening, or the desired opening will be quickly located on the initial downward traverse, as will be understood.

ENCODED-CONTAINER (BOX) SYSTEM

For certain applications beyond those already described, it is desirable to have all or an important fraction of the coding information (to be scanned) carried by or applied directly to each removable container or box 93–94, from which the packages are exposed for selective retrieval in the manner already described. FIGS. 14 to 16 illustrate such an application, wherein both scan components of the coded information are shown directly exposed along outwardly exposed edges 260–261 of the open retrieval-access end of the container 262.

The container 262 may be in all respects similar to that already described at 94, except for the formation of a character-identification surface or surfaces along one or more edges of the open retrieval-access end of the container. In the form shown, a strip or flange 261 along the upper edge of the opening carries the horizontally elongated code component, which may correspond to that described for "PRICE" and "SIZE" in FIG. 10; and a strip or flange 262 along the left edge of the opening carries the vertically elongated code component, which may correspond to that described for "STYLE" in FIG. 10. To avoid fouling the item 96 upon its retrieval by means 29, the upper character flange 260 is shown in FIG. 14 to extend downwardly no more than the lowermost part of retaining rod 97; also, the left edges of the stacked items 96 are shown located by an upstanding inner side plate or flange 263 which so positions the items 96 as to encounter little or no interference with the edge of flange 260, upon retrieval.

FIGS. 15 and 16 show slight repositioning of scanners 231–239 as called for to assure that their scan axes align with the coded-strip character components for which they respectively scan. The scan action, positioning drive, and article-retraction functions are otherwise as previously described. And it will be understood, for example, that merely by replacing one column of containers or boxes of a discontinued style, with another set of similar boxes, preloaded and precoded to a new and differently code style, the machine of the invention will automatically accommodate its operation to correct retrieval of items from the new style.

CONCLUSION

It will be appreciated that I have described a basically simple and fool-proof automatic retrieval means whereby any desired number of like items may be sought and retrieved automatically. The apparatus certifies that the items have been removed, and provision may be made for noting the extent to which inventory has been thus depleted and also for noting price and other important identifying information in connection with the item itself. The particular technique of coding and code recognition ensures that the system is applicable to the customer's existing decimal-digit style, price, size, and other identifying indicia and that within limits no particular effort need be made to collect the style numbering in any particular sequential arrangement. In other words, style 500 can be removed from the middle of the system and replaced with style 999 without in any way affecting the ability to automatically home-in and scan all the other styles and sizes which may have been allowed to remain unchanged in the matrix.

The foregoing is achieved with accuracy determined by digital scan at the desired location. Back lash is avoided by accomplishing scan, search, and home-in functions without having to transduce location data. Speed also characterizes the operation because the slide 11 and carriage 13 may be of relatively low mass, as may also the cable-drive system; moreover, the drive motors 109–123 may be of the low-inertia and high-torque variety, developing high accelerating and decelerating torques, while using but a fraction of the rated motor capacity, thus assuring extended-life performance.

While the invention has been described in detail for the forms shown, it will be understood that modifications may be made without departing from the scope of the invention as defined in the claims which follow.

What is claimed is:

1. Automatic package storage and retrieval apparatus, comprising an array of stationary storage compartments having generally horizontally facing front open ends in essentially a single upstanding retrieval-access surface common to all said compartments, individual storage-compartment cartridges unique to each compartment and removably supported therein with an open front end substantially at said surface, each said cartridge including loading means for accommodating and forwardly urging a generally horizontally stacked plurality of like items with the front end item of each stack presented for direct retrieval access at said retrieval-access surface, a digitalized character identification unique to each compartment stack and exposed for scanning at substantially said surface, fixed elongated guide means effectively coextensive with said array, retrieval-slide means and drive means for traversing said slide means along said guide means; compartment-selection control means including a compartment-digit selector, character-scanning means carried by said retrieval-slide means, and coincidence-detecting means responsive to the outputs of said selector and of said scanning means for controlling said drive means to position said retrieval-slide means adjacent the open side of the compartment for which digital coincidence is detected; and selectively operable item-retrieving means carried by said slide means and selectively movable into and out of said retrieval-access surface, whereby the front item at the selected cartridge location may be extracted, and means controlled by said coincidence-detecting means for moving said item-retrieving means into and out of said surface upon coincidence detection.

2. Apparatus according to claim 1, in which said array includes a frame with stationary elements defining margins of each compartment at substantially said surface, said character identifications being carried by said frame at corresponding margins of said compartments.

3. Apparatus according to claim 1, in which said character identifications are carried by said cartridges at substantially said surface and at corresponding margins of said cartridges.

4. Apparatus according to claim 1, in which said character identifications are carried by said like items at corresponding locations of the horizontally outwardly facing surface of each such item.

5. Apparatus according to claim 1, in which said array is two-dimensional and said surface is substantially plane.

6. Apparatus according to claim 1, in which said array is three-dimensional and said surface is generally cylindrical.

7. Apparatus according to claim 1, in which said array comprises a first vertically-arrayed dimension of said compartments, and a second arcuately arrayed dimension of said compartments, said retrieval-access surface being essentially cylindrically arcuate with said compartments radially inwardly facing at said surface.

8. Apparatus according to claim 1, in which the character identifications for stacked items in two of said compartments are duplicates of each other, in which said control means preferentially positions said retrieval-slide means adjacent one to the exclusion of the other of said two compartments as long as the stacked items are retrievable therefrom, and in which means responsive to an exhausted supply of items in said one compartment is operative on said control means to reposition said slide means for item-retrieval from the other of said two compartments.

9. Apparatus according to claim 1, and including alarm means responsive to a detected exhausting of the item supply in a compartment.

10. Apparatus according to claim 1, in which each cartridge includes yieldable retaining means for the front end item of said stack at said retrieval-access surface.

11. Apparatus according to claim 10, and including position-monitoring means carried within said one cartridge and responsive to the instantaneous position of the rear-most remaining item in the stack within said one cartridge, and display means for indicating such response.

12. Apparatus according to claim 1, and including latch means reacting between each cartridge and its compartment for retaining a predetermined inserted position thereof.

13. Apparatus according to claim 1, in which said compartments extend generally normal to said surface and have second open ends remote from said surface, said cartridges being removably insertable in said compartments via the second open ends thereof.

14. Automatic storage and retrieval apparatus, comprising a multi-dimensional matrix frame of stationary storage compartments having generally horizontally facing front open sides in essentially a single upstanding retrieval-access surface common to the compartments of said matrix, each said compartment including removable cartridge means with an open front end substantially at said surface and with loading means accommodating and forwardly urging a generally horizontally stacked plurality of like items with the front end item of each stack presented at said retrieval-access surface, said matrix comprising a first vertically-arrayed dimension of said compartments and a second arrayed dimension in a horizontal plane, whereby a particular compartment in said matrix is defined by vertical and horizontal coordinates, a first digitalized character identification unique to the horizontal coordinates of each compartment and externally exposed at said matrix, said first character identifications being generally in a horizontal alignment, a second digitalized character identification unique to the vertical coordinate of each compartment and externally exposed at substantially said surface, said second character identifications being in corresponding areas of all compartments in relation to said open sides, related multi-component elongated guide means spanning said matrix adjacent said surface, retrieval-slide means guided by said guide means and selectively positionable adjacent a selected one of said compartments, drive means for traversing said retrieval-slide means along said guide means; and compartment-selection control means including a compartment-digit selector, horizontal-coordinate character-scanning means and vertical-coordinate character-scanning means carried by said retrieval-slide means, coincidence-detecting means responsive to the outputs of said selector and of said scanning means for controlling said drive means to position said retrieval-slide means adjacent the open side of the compartment for which digital coincidence is detected, and item-engaging means reciprocably mounted on said slide means and selectively movable into and out of said retrieval-access surface, whereby the front item at the selected cartridge location may be extracted, and means controlled by said coincidence-detecting means for moving said item-engaging means into and out of said surface upon coincidence detection.

15. Automatic storage and retrieval apparatus according to claim 14, in which said guide means extend respectively horizontally and vertically, said horizontal guide means being elongated and extending the effective length of said matrix; said retrieval-slide means including a main carriage guided by said horizontal guide means and a slide guided for vertical movement on said carriage, whereby the vertical guide means is on said carriage, said carriage being selectively positionable adjacent a selected longitudinal location; said drive means including horizontal-drive means for longitudinally traversing said retrieval-slide means along said horizontal guide means, and vertical-drive means for vertically traversing said slide along said vertical guide means.

16. Automatic storage and retrieval apparatus according to claim 15, in which said carriage comprises a frame including upstanding member spaced horizontally by at least substantially the horizontal dimension of said items as oriented in their stacks, said carriage frame also including upper and lower horizontal members spaced vertically by at least substantially the effective vertical extent of said array, said carriage frame being oriented in essentially a vertical plane facing and offset from said retrieval-access plane, said item-retrieval means being carried by said slide means between said carriage-frame members and selectively movable between said retrieval-access plane and an item-release plane at substantially the plane of said carriage frame.

17. Apparatus according to claim 15, in which said horizontal-drive means includes a flexible cable secured at both ends to said carriage and looped under tension via pulley means at opposite longitudinal ends of said matrix.

18. Apparatus according to claim 17, in which said horizontal-drive means further includes matrix-based means in reversible-driving engagement with the loop of said cable at one of the longitudinal ends of the matrix.

19. Apparatus according to claim 15, in which said vertical-drive means includes a flexible cable secured at both ends to said matrix frame and looped under tension via pulley means at the upper and lower ends of said carriage.

20. Apparatus according to claim 19, in which the loop of said flexible cable includes an upper connection from upper pulley means to one end of said matrix frame, a lower connection from lower pulley means to said end of the matrix frame, and a loop extending horizontally from upper pulley means to the other end of said matrix thence vertically down and horizontally back to the lower pulley means; and in which said vertical drive means further includes matrix-based means in reversible-driving engagement with said cable at said other end of the matrix.

21. Automatic package storage and retrieval apparatus, comprising a multi-dimensional matrix of stationary storage compartments having generally horizontally facing front open ends in essentially a single upstanding retrieval-access surface common to the compartments of said matrix, each said compartment containing removable means including a cartridge with an open front end substantially at said surface and loading means for accommodating and forwardly urging a generally horizontally stacked plurality of like items with an end item of each stack presented at said retrieval-access surface, a digitalized character identification carried by and unique to the removable means of each compartment and externally exposed at substantially said surface, said character identification being in corresponding areas of all compartments in relation to said open sides, related multi-component guide means spanning said matrix adjacent said surface, retrieval-slide means guided by said guide means and selectively positionable adjacent a selected one of said compartments, drive means for traversing said retrieval-slide means along said guide means; compartment-selection control means including a compartment-digit selector, character-scanning means carried by said retrieval-slide means, and coincidence-detecting means responsive to the outputs of said selector and of said scanning means for controlling said drive means to position said retrieval-slide means adjacent the open side of the compartment for which digital coincidence is detected; item-retrieving means carried by said slide means and selectively movable into and out of said retrieval-access surface, whereby the front item at the selected cartridge location may be extracted, and means including a control connection from said coincidence-detecting means to said item-retrieving means for actuating the latter upon coincidence detection.

22. Apparatus according to claim 21, in which at least a part of said digitalized character identification is directly carried by each item of each stack.

23. Apparatus according to claim 22, in which at least a part of said digitalized character identification is directly carried by said cartridge.

24. Apparatus according to claim 23, in which the retrieval end of said cartridge includes a character-supporting surface along a marginal edge of said cartridge, said character-supporting surface being an outwardly exposed surface in substantially the plane of said retrieval-access surface, at least a part of said character identification being directly carried by said outwardly exposed surface.

25. Automatic package storage and retrieval apparatus, comprising a two-dimensional matrix of stationary storage compartments having generally horizontally facing front open ends in essentially a single upstanding retrieval-access plane common to the compartments of said matrix, each said compartment including removable-cartridge means with an open front end substantially at said surface and accommodating a generally horizontally stacked plurality of like items, each cartridge means also including loading means for continuously forwardly urging a stack of items to present the front end item of each stack at said retrieval-access plane, a digitalized character identification unique to the local region of each compartment and externally exposed at substantially said plane, said character identifications being in corresponding areas of all compartments in relation to said open sides, first elongated guide means effectively coextensive with one of the dimensions of said matrix; retrieval-slide means including a main carriage guided by said guide means, a slide guidably supported by second guide means on said carriage on a guide axis effectively coextensive with the other dimension of said matrix, first drive means for traversing said carriage along said first guide means, said first drive means including tensioned flexible-cable means between said carriage and said matrix at opposite longitudinal end locations of said first guide means, second drive means including tensioned flexible-cable means between said slide and said carriage at opposite end locations of said second guide means and between said carriage-end locations and said matrix-end locations; and compartment-selection control means including a compartment-digit selector, character-scanning means carried by said retrieval-slide means, and coincidence-detecting means responsive to the outputs of said selector and of said scanning means for controlling said drive means to position said retrieval-slide means adjacent the open side of the compartment for which digital coincidence is detected.

* * * * *